United States Patent Office 2,736,038
Patented Feb. 28, 1956

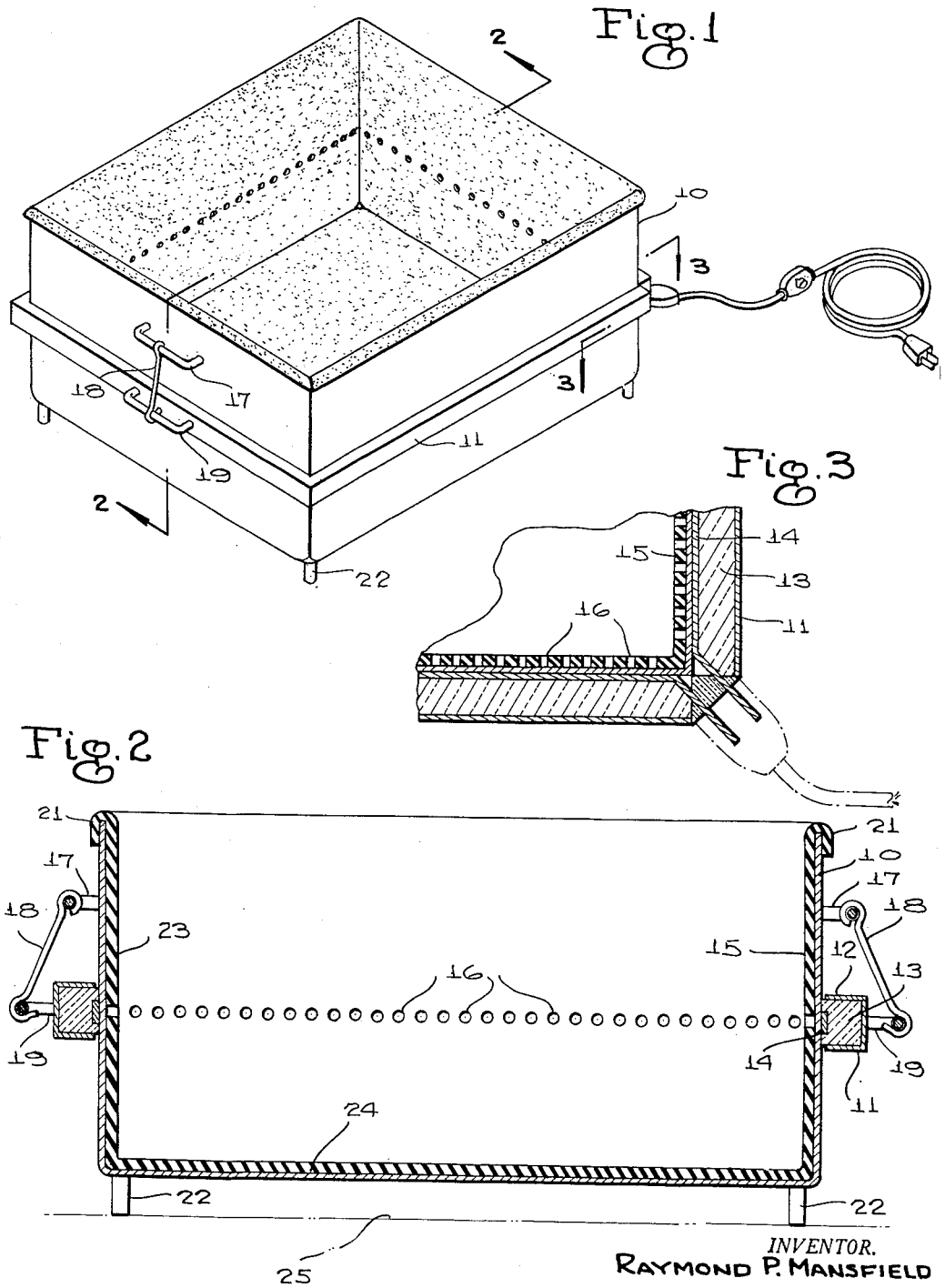

2,736,038
FOOT TREATING VESSEL

Raymond P. Mansfield, Groton, Conn.

Application June 25, 1954, Serial No. 439,260

2 Claims. (Cl. 4—182)

The present invention relates to thermal therapy apparatus generally, and specifically to a vessel adapted to apply hot water soaks to the feet of arms.

There are many types of foot baths available and they are of many designs and styles, nearly all of them requiring the services of another person to intermittently renew the water or to bring more hot water to the user. Ordinarily the person desiring to soak his feet or arms will limit his use of a water soak rather than inconvenience other persons or go to the trouble of repeatedly drying his limbs and obtaining more water each time it cools.

The present invention is intended therefore to provide a vessel which has its heating device so that the user need not have to rely upon another source of hot water and inconvenience himself with the trouble of replenishing the hot water every few minutes.

A primary object of the present invention is to provide a vessel having its own heating element assembly, and one that is removable so that the vassel can be cleaned without damage to the element.

Another object of the present invention is to provide a vessel for soaking the limbs which is lined with a resilient liner for the comfort of the individual.

A further object of the present invention is to provide a vessel for soaking the limbs or feet which may be used for other purposes and without the heating element.

A still further object of the present invention is to provide an inexpensively constructed vessel for soaking the feet, and one that can be cleaned and stored without any traces of foot powder or medicinal solutions remaining, and one in which a resilient liner is removable for sterilizing or other treatment.

These and other objects and advantages of the present invention will be fully apparent on consideration of the following description when taken with the annexed drawings, in which:

Figure 1 is a perspective view of the present invention showing the heating element assembly in place.

Figure 2 is a cross sectional view taken on line 2—2 of Figure 1, and

Figure 3 is a fragmentary view in section taken on line 3—3 of Figure 1.

Referring more particularly to the drawing in which like numerals indicate parts throughout the several views, the present invention is seen to consist of a metal pan or vessel 10 of substantially rectangular shape and a similarly shaped heating element assembly 11 which is formed of an inwardly facing channel member 12 lined with porcelain or other heat resisting and non-conducting materials. This non-conducting member 13 surrounds on three sides a heating element 14, of the type that is used in electric stoves and is known as "Calrod," of commercial make and design, having its core electrically insulated from the metallic outer covering, and being formable on suitable dies and machines to the rectangular shape here desired.

A liner member 15 of neoprene rubber or other suitable resillient and heat resisting material is fitted into the vessel 10 for easy removal and has a series of holes 16 in a horizontal pattern opposite the position of the heating element assembly 11 so that the heated wall of the vessel may transmit its heat to the water at this point.

A pair of handles 17, one at each of two opposite sides or ends of the vessel project outwardly and serve as a means of holding the heating element assembly 11 at the desired position, with the hooks 18 engaging the other handles 19 which are secured to the heating element assembly 11, preferably at a spaced distance from the handles 17 so as to prevent burns to the hands while moving the vessel.

It will be easily seen that the heating element assembly may be slipped on the vessel from the bottom, and can be made with a snug fit, or the vessel can be tapered slightly and the channel members formed to fit on a tapered surface.

The liner member 15 is preferably made with an outwardly molded edge 21 so that no rought or sharp edge of the vessel is felt by the person if he uses the vessel to soak a wrist or elbow. The vessel 10 is fitted, as shown in the one preferred embodiment of the present invention with short legs 22, but these may be omitted if desired and if it is found that the walls 23 of the vessel do not get hot enough to require that the vessel bottom 24, be insulated or spaced from the floor, indicated by the reference number 25.

The liner member 15 may be removed for sterilizing and the vessel 10, without the liner and the heating element assembly 11 may be used for other purposes.

While a single embodiment of the present invention has been here shown and described, it is contemplated that other embodiments may be made or practiced and many changes and modifications are possible without departing from the spirit and scope of the invention as set forth in the appended claims.

1. A foot treating apparatus comprising a pan-like vessel, a similarly shaped heating element assembly, handles projecting outwardly from said vessel and said assembly at each of two opposing sides, a liner member for said vessel of resilient material removably positioned therewithin, and means for releasably securing the handles at each side of the vessel to the corresponding handle of the assembly for support of the assembly on said vessel at a spaced distance from said vessel's handles.

2. A foot treating apparatus comprising a pan-like vessel, a similarly shaped heating element assembly, handles projecting outwardly from said vessel and said assembly at each of two opposing sides, means for releasably securing the handle at each side of the vessel to the corresponding handle of the assembly for support of the assembly on said vessel at a spaced distance from said vessel's handles, and a liner member for said vessel of resilient material removably positioned therewithin, said liner member being provided with a series of horizontally disposed holes spaced opposite said heating element assembly for the circulation of water in the vessel to a point of contact with the vessel's walls where heated.

References Cited in the file of this patent

UNITED STATES PATENTS

| 1,389,050 | Jarrett | Aug. 30, 1921 |
| 1,645,230 | Corlew et al. | Oct. 11, 1927 |
| 2,392,208 | Wilken | Jan. 1, 1946 |